Oct. 6, 1959   F. D. COVELY 3RD   2,907,519
APPARATUS FOR AND METHOD OF COUNTING PERTURBATIONS IN A FIELD
Filed Dec. 22, 1953   2 Sheets-Sheet 1

INVENTOR.
Frank D. Covely, 3rd
BY
ATTORNEY

Oct. 6, 1959     F. D. COVELY 3RD     2,907,519
APPARATUS FOR AND METHOD OF COUNTING PERTURBATIONS IN A FIELD
Filed Dec. 22, 1953     2 Sheets-Sheet 2

INVENTOR.
Frank D. Covely, 3rd
BY
ATTORNEY

United States Patent Office 2,907,519
Patented Oct. 6, 1959

2,907,519

APPARATUS FOR AND METHOD OF COUNTING PERTURBATIONS IN A FIELD

Frank D. Covely 3rd, Haddonfield, N.J., assignor to Radio Corporation of America, a corporation of Delaware Application December 22, 1953, Serial No. 399,715

3 Claims. (Cl. 235—92)

This invention relates generally to apparatus for and a method of counting perturbations in a field. More particularly, the invention relates to apparatus for and a method of scanning an optical field with an electron beam in a novel manner for the purpose of deriving signals from perturbations within the scanned field, and means for interpreting these derived signals in order to obtain an accurate count of the perturbations within the field. While neither specifically nor exclusively limited thereto, the apparatus for and method of counting perturbations in a field, in accordance with the present invention, are particularly useful for counting foreign particles, blood cells, and other perturbations in an optical field.

The term perturbation, as used herein, refers to a discrete particle in an optical field and visible in contrast thereto.

In the medical and industrial fields, it has become increasingly important to obtain a count of certain perturbations within an optical field. For instance, in the medical field, in many cases it is important to know the number of red or white blood cells in an optical field as an indication of the physical condition of a patient. Also, it is often desirable to count the number of bacterial colonies which may have grown in a controlled culture medium during a fixed period of time. In the industrial field, it is often desirable to count the number of foreign particles in a given sample of air or liquid as an indication of the quality thereof. Most of these counting procedures, today, are carried out by technicians laboriously counting the number of perturbations viewed within a fixed field of a microscope.

It has been proposed to count the perturbations within a field by means of scanning the field with a flying spot scanner. One of the more difficult problems, however, that has arisen in the development of a scanning counting device is that of avoiding counting the same perturbations a number of times in proportion to its size with respect to the scanning resolution. Since a sharply focussed electron beam may scan the same perturbation a number of times during one frame of a raster, means must be provided for counting the same perturbation only once, regardless of the number of times it is scanned. In some prior art counting devices, apparatus has been provided to estimate an average diameter of the perturbations counted in order to make corrections in the final count. Such prior art devices merely give an estimate of the perturbations within an optical field, rather than an actual, accurate count of such perturbations.

It is, therefore, a principal object of the present invention to provide improved apparatus for and a novel method of counting perturbations in an optical field.

It is another object of the present invention to provide improved apparatus for and a novel method of counting perturbations in a field whereby the count obtained is more accurate and/or faster than can be done by a technician physically counting the perturbations.

It is a further object of the present invention to provide improved apparatus for and a novel method of counting perturbations within a field whereby a large number of counts may be made faster, more accurately, and more economically than heretofore.

In general, the foregoing and other objects of the present invention are accomplished by apparatus for and a method of scanning an optical field, containing the perturbations to be counted, in a vertical direction at a relatively low frequency, and in a horizontal direction at a relatively much higher frequency. Means are provided to oscillate the electron beam slightly in a vertical direction at a frequency which is relatively much higher than the frequency of horizontal scanning, whereby the optical field may be said to be scanned by a spot wobbulated beam. Means comprising an image pick-up tube are provided to derive two series of signals from the lower and upper excursions, respectively, of the high frequency oscillations of the electron beam, when the electron beam strikes the perturbations within the optical field. The successive signals from the two series of signals are compared. The comparing circuits comprise means whereby a single perturbation is counted only once, and that is when the derived signals are from the lower excursions of the oscillations of the electron beam and in the absence of signals from the upper excursions of the oscillations of the electron beam. When signals are derived successively from both the upper and lower excursions of the electron beam no perturbation is counted. Also, when signals are derived only from the upper excursion of the oscillations of the electron beam no perturbation is recorded. A frame selector is provided to pass the signals from the perturbations scanned during a single scanning only of the entire optical field.

The novel features of the invention, as well as the invention itself, both as to its organization and method of operation, will be understood in detail from the following description when considered in connection with the accompanying drawings in which similar elements have similar reference characters, and in which.

Figure 1:
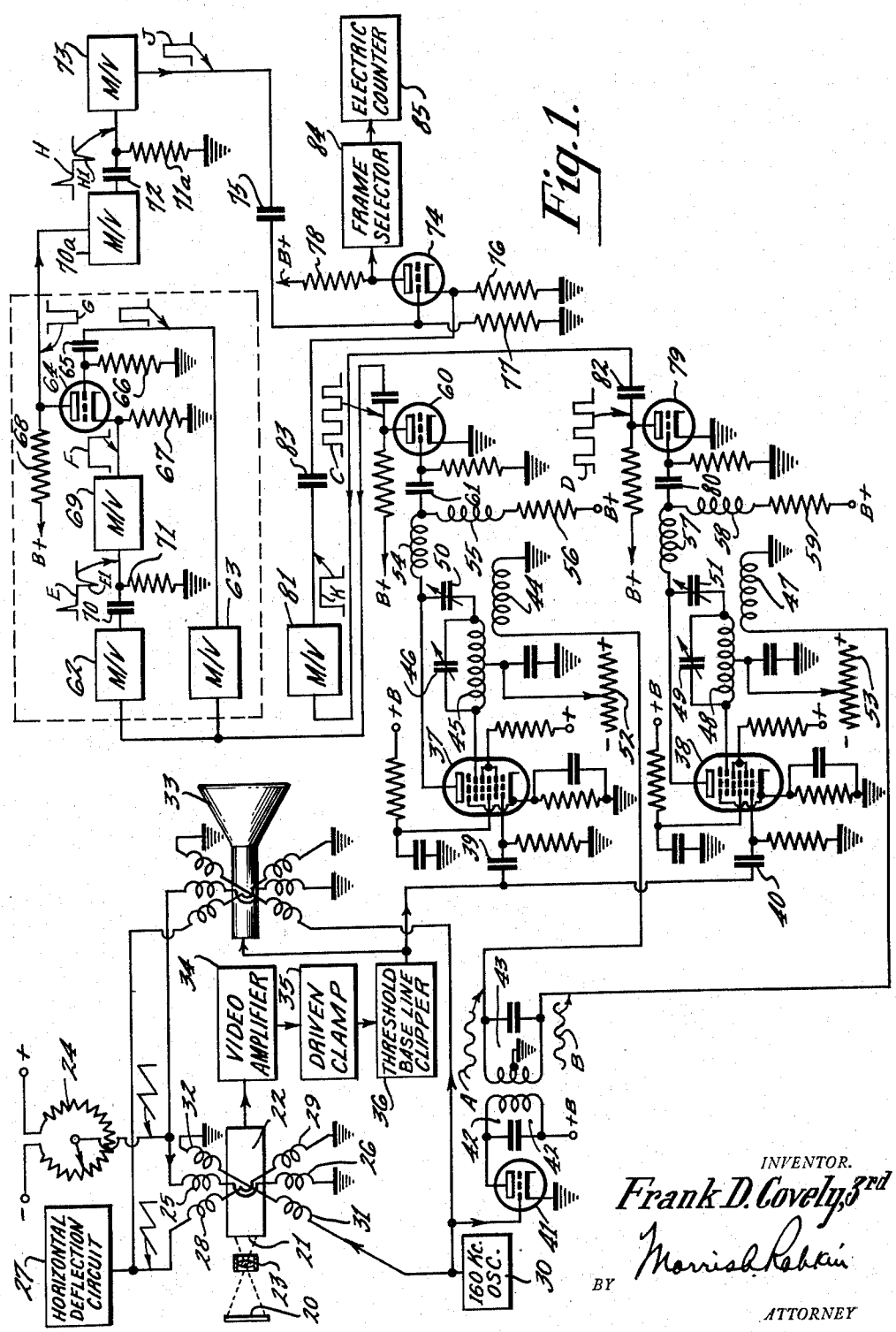
Fig. 1 is a schematic diagram, partly in block form, of apparatus for counting perturbations in a field, in accordance with the present invention.

Referring now to Fig. 1, there is shown apparatus for counting the perturbations in an optical field 20. The optical field may be that seen when looking into a microscope (not shown), and the perturbations within the optical field 20 may be discrete particles such as blood cells, bacterial growth, dust particles, and the like. In order to count the perturbations within the optical field 20, the field 20 is focussed upon the face 21 of an image pick-up tube 22 through a suitable lens system 23. The pick-up tube 22 may be a "vidicon," "image orthicon," or other suitable image pick-up tube.

Means are provided to scan the face 21, upon which the optical field 20 is focussed, in a spot wobbulated manner. To this end, an electron beam (not shown) within the pick-up tube 22 is periodically deflected vertically at a relatively low frequency, say one cycle per second. A source of potential (not shown) is connected across the ends of a potentiometer 24. The movable tap of the potentiometer 24, which is motor driven, is connected to ground through vertical deflection coils, 25, 26. It will now be understood that if the movable tap of the potentiometer 24 is driven at a rate of one cycle per second, the electron beam of the tube 22 will scan the face 21 thereof vertically at a frequency of one cycle per second in a sawtooth manner.

Means are provided to sweep the face 21 of the tube 22 horizontally at a relatively higher frequency, say about 400 cycles per second. To this end, a horizontal deflection oscillator 27, of conventional type, is connected to ground through horizontal deflection coils 28 and 29.

In order to spot wobbulate the electron beam of the tube 22, an oscillator 30, oscillating at a frequency relatively much higher than the horizontal scanning frequency, say 160 kc. per second, is connected to ground through tertiary deflection coils 31 and 32. The tertiary coils 31 and 32 are arranged about the tube 22 in order to deflect the electron beam thereof in a vertical direction. The amplitude of the deflection produced by the tertiary coils 31 and 32 may be about one time the diameter of the electron beam of the tube 22. Thus, it will be understood that the projection of the optical field 20 on the face 21 of the tube 22 is scanned in a spot wobbulated manner whereby an electron beam simultaneously sweeps the face 21 in a vertical direction at a relatively low frequency, and in a horizontal direction with an oscillatory, or wavy, motion at a relatively higher frequency. The oscillatory motion of the beam moving in the horizontal direction is relatively much higher than the frequency of horizontal scanning.

The optical field 20 may be monitored on a cathode ray tube 33. The cathode ray tube 33 is swept by its electron beam in the same manner as the tube 22 and the output of the tube 22 is applied to the input circuit (not shown) of the cathode ray tube 33. Since the operating circuits for the tube 22 and the cathode ray tube 33 may be of conventional design, a more detailed description is omitted from the description herein because details thereof are well known in the art.

The output from the tube 22 is fed to a video amplifier 34, thence to a driven clamp 35, of conventional design, where all signals are referred to a common reference potential, and thence to a threshold circuit 36, of conventional design, in order to remove all signals smaller than a predetermined amplitude. In other words, the threshold circuit 36, is merely an amplifier biased to reject noise and to permit all signals above a predetermined amplitude to pass. The output of the threshold circuit 36 is fed to the first grids of each of two pentagrid tubes 37 and 38, through coupling capacitors 39 and 40, respectively. Thus, it will be understood that when the electron beam of the tube 22 scans across the image of a perturbation projected onto its face 21, a signal will be derived at the output of the tube 22 which is applied to the input of the first grids of the tubes 37 and 38. The pentagrid tubes 37 and 38 are connected in a sampling circuit comprising means to sample the derived signals from the tube 22 at the lower and upper limits of the excursion of the oscillations of the horizontal scanning lines.

The output of the oscillator 30 is applied to the grid of a triode tube 41 connected in a circuit as a split-phase amplifier. The anode of the tube 41 is connected to a source of B+ voltage (not shown) through a parallel resonant circuit 42. An oscillating output of the triode 41 is derived across the ends of a parallel resonant circuit 43 inductively coupled to the resonant circuit 42. One end of the resonant circuit 43 is inductively coupled to the fourth grid of the pentagrid tube 37 through an inductance 44 and an inductance 45. A capacitor 46 is connected across the inductance 45 and forms a resonant circuit therewith which is tuned to the frequency of the oscillator 30. The other end of the resonant circuit 43 is inductively coupled to the fourth grid of the pentagrid 38 through an inductance 47 and an inductance 48. A capacitor 49 is connected across the inductance 48 and forms a resonant circuit therewith which is tuned to the frequency of the oscillator 30. It will be understood that the outputs from the opposite ends of the resonant circuit 43 will be oppositely phased, sine wave voltages which are precisely in phase with the limits of the excursions of the wobbulated electron beam. The positive peaks of these sine wave voltages allow tubes 37 and 38 to conduct alternately and thus sample the instantaneous signal amplitudes on the first grid of each tube. A capacitor 50 connects one end of the parallel resonant circuit comprising the inductance 45 and the capacitor 46 to the anode of the pentagrid tube 37 for neutralization purposes. A capacitor 51, similar to the capacitor 50, connects one end of the resonant circuit comprising the inductance 48 and the capacitor 49 to the anode of the pentagrid tube 38 for neutralization purposes also. A tap on the inductance 45 is connected to a movable tap of a potentiometer 52. The potentiometer 52 is connected across a source of unidirectional potential (not shown) for the purpose of setting the clipping level of the pentagrid tube 37. A potentiometer 53 having a movable tap connected to a tap on the inductance 48 is provided to set the clipping level of the pentagrid tube 38. The potentiometer 53 is also connected across a source of unidirectional potential (not shown). The anode of the pentagrid tube 37 is connected to a source of unidirectional potential (not shown) through peaking coils 54, 55 and a load resistor 56. The anode of the pentagrid tube 38 is connected to a source of unidirectional potential (not shown) through peaking coils 57, 58 and a load resistor 59.

The circuitry associated with the pentagrid tubes 37 and 38 provide means for sampling the derived signals from the tube 22 at the upper and lower limits of the oscillating electron beam during its horizontal scanning.

The output of the pentagrid tube 37 is coupled to the grid of a triode tube 60 through a capacitor 61. The triode tube 60 is connected as a conventional inverter whereby inverted signals are derived at its anode. The output of the anode of the triode tube 60 is capacitively coupled to the inputs of monostable multivibrators 62 and 63. The monostable multivibrators 62 and 63 are of conventional design and are adapted to provide a squarewave output in response to an input signal, in the manner well known in the art. The output of the multivibrator 63 is applied to the grid of a triode tube 64 through a capacitor 65. The grid of the tube 64 is connected to ground through a resistor 66. The cathode of the tube 64 is connected to ground through a resistor 67. The anode of the tube 64 is connected to a source of B+ potential (not shown) through a load resistor 68.

The function of multivibrator 62 is to provide a means for delaying the signal, as will be explained hereinafter in greater detail. Other delay techniques such as lumped constant delay lines or phantastrons may be used.

The output of the multivibrator 62 is adjusted to provide a positive squarewave output having a duration slightly less than the period of oscillation of the oscillator 30. The output of the multivibrator 62 is coupled to the input of a monostable multivibrator 69 through a capacitor 70. The capacitor 70 and the input to the multivibrator 69 are connected to ground through a resistor 71. It will be understood that the output of the multivibrator 62 is differentiated by capacitor 70 and the resistor 71, and that the multivibrator 69 is adapted to be triggered by the trailing edge of the differentiated output of the multivibrator 62, in a manner well known in the art.

The output of the multivibrator 69 is a squarewave voltage which is applied to the cathode of the tube 64. Thus, it is seen that the tube 64 may act as a gate to "gate on" a signal when a positive signal is applied to its grid in the absence of a signal from multivibrator 69 applied to its cathode, and to "gate off" a signal from the multivibrator 63 when a positive square wave from the output of the multivibrator 69 is applied to its cathode, as will hereinafter be explained. In this manner a series of pulses which occur on sequential samples of the video signal will produce a single pulse only corresponding to the first pulse of the series at the output of the tube 64, as will be explained hereinafter in greater detail.

The output of the triode 64 is applied to the input of a monostable multivibrator 70a. A positive squarewave output from the multivibrator 70a is differentiated across a resistor 71a which is connected to the output of the multivibrator 70a through a capacitor 72. One end of the resistor 71a is connected to ground and the other end to a monostable multivibrator 73 which is adapted to be triggered by the trailing edge of the differentiated output from the multivibrator 70a, in a well known manner. The width of the positive squarewave output from the multivibrator 70a is slightly greater in duration than one-half of the period of oscillation of the oscillator 30, so that the multivibrator 73 is triggered "on" a little after one-half of the period, of the oscillator 30, from the time the multivibrator 70a is triggered. The output from the multivibrator 73 is a narrow positive squarewave which is applied to the grid of a triode tube 74 through a capacitor 75. The triode 74 is connected in circuit to function as a comparator. The cathode of the tube 74 is connected to ground through a resistor 76. The grid of the tube 74 is connected to ground through a resistor 77, and the anode of the tube 74 is connected to a source of B+ potential (not shown) through a resistor 78. In this manner, the first pulse of the aforementioned series reaches the control grid of tube 74 delayed in time, with respect to the leading edge of the square wave output of the multivibrator 70a, slightly greater than one half of the period of the sine wave oscillator 30.

The output of the pentagrid tube 38 is connected through a coupling capacitor 80, to the grid of a triode tube 79. The tube 79 is connected in circuit as a conventional inverter. The output from the anode of the triode 79 is connected to the input of a monostable multivibrator 81 through a coupling capacitor 82. The output of the multivibrator 81 is a lengthened positive squarewave which is coupled to the cathode of the triode 74 through a coupling capacitor 83. The tube 74 is normally biased below cutoff. In the absence of a pulse from multivibrator 81, the pulse on the control grid of the triode 74 from the multivibrator 73 will appear on the plate of tube 74. The presence of a pulse from the multivibrator 81 will block the pulse in the control grid of the tube 74. The output from the anode of the triode 74 is connected to the input of a frame selector circuit 84 for the purpose of counting the perturbations scanned by the electron beam of the tube 22 during one frame of the scanned raster. The circuitry of the frame selector 84 is shown in detail in Fig. 4, and will be described hereinafter in detail. The output of the frame selector 84 is connected to an electronic counter 85, of conventional design, adapted to count the positive pulses from the frame selector 84 as a function of the perturbations in the optical field 20.

Figure 2A:
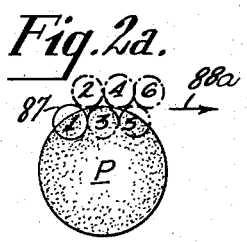
Figs. 2a, 2b and 2c represent an electron beam scanning different portions of a perturbation, in accordance with the present invention.
Figure 2B:
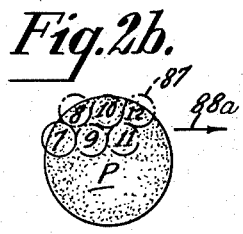
Figure 2C:
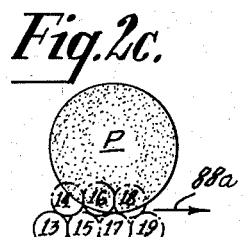

Referring now to Fig. 2a there is shown, greatly enlarged, a perturbation P in the process of being scanned by an electron beam 87, represented in cross-section. The electron beam 87 scans the perturbation P while moving in a horizontal direction indicated by the arrow 88a, from left to right, in an oscillatory manner whereby it moves successively from position 1, indicated within the cross-section of the electron beam 87, to positions 2, 3, 4, 5, 6, etc. The positions 1, 3 and 5, for example of the electron beam, shown in Fig. 2a, represent the lower limits of the oscillatory oscillation of the electron beam 87 during its horizontal scanning; and the positions 2, 4 and 6 represent the upper limits of the oscillations of the horizontal beam 87. In Fig. 2b, the electron beam 87 is represented by positions 7, 8, 9, 10, 11, 12 etc., during a successive horizontal scan with respect to the previous horizontal scan represented in Fig. 2a. In Fig. 2c, the electron beam 87, represented by the positions 13, 14, 15, 16, 17, 18, 19, etc., represents still a further successive horizontal scan with respect to the horizontal scan represented in Fig. 2b.

Signals generated by partial beam diameter overlap on a perturbation are accepted or rejected by the setting of the threshold circuit 30 which remains substantially the same throughout the scanning.

The apparatus for and method of counting the perturbations in the optical field 20 will now be described, in accordance with the present invention. The image of the optical field 20, projected upon the face 21 of the tube 22, by means of the optical system 23, is scanned by the electron beam thereof. As explained above, the electron beam of the tube 22 is moved simultaneously in a vertical position at a relatively slow rate, say one cycle per second, in a horizontal position at a relatively faster rate, say 400 cycles per second, and with a vertical oscillatory motion while moving in the horizontal position at a relatively much higher frequency, say 160 kc. per second. The vertical peak to peak distance of the oscillatory motion of the electron beam is in the neighborhood of about one diameter of the cross-section of the electron beam. This particular type of scanning will be referred to hereinafter in this description, and in the appended claims, as spot wobbulation scanning. The frequency of the vertical, horizontal, oscillatory motion and the amplitude of the oscillatory motion, imparted to the electron beam during the scanning of the optical field projected upon the face 21 of the tube 22 are to be considered merely illustrative, and by no means in a limiting sense. Since the cathode ray tube 33 is scanned by its electron beam in a manner similar to that of the pickup tube 22, the operator of the device may focus the optical field 20 onto the face 21 of the tube 22 by observing the optical field 20 reproduced on the face of the cathode ray tube 33. Since a perturbation P within the optical field 20 is represented in contrast to the background of the field 20, the electron beam of the pick-up tube 22 will produce a signal every time it scans across the perturbation P. The derived signals from the perturbations are fed from the pickup tube 22 to the video amplifier 34, where they are amplified and thence to a driven clamp circuit 35, where they are referred to a reference potential. The derived signals are then fed to the threshold circuit 36 where only signals greater than a predetermined amplitude are allowed to pass, and applied to the number 1 grids of the pentagrid tubes 37 and 38.

Figure 3:
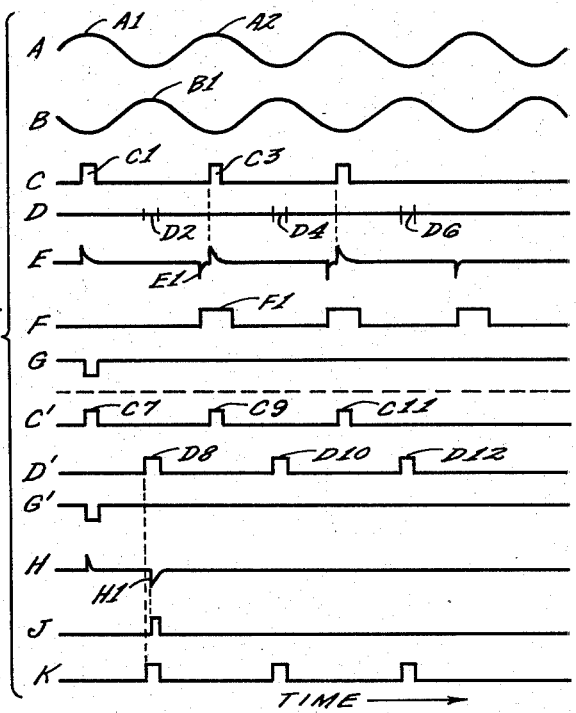
Fig. 3 represents a series of voltage waveforms used to explain the operation of the apparatus of Fig. 1.

Oppositely phased signals from the split phase amplifier 41 are coupled to the fourth grids of the pentagrid tubes 37 and 38. Referring now to Fig. 3, there is shown an oscillatory voltage waveform A of the type applied to the fourth grid of the pentagrid tube 37. The abscissae represent time and the ordinates represent amplitude in Fig. 3. A voltage waveform B, 180° out of phase with respect to the waveform A, is applied to the fourth grid of the pentagrid tube 38. It will now be understood that if the clipping levels of the tubes 37 and 38 are properly adjusted any signals applied to the number 1 grids of the tubes 37 and 38 will be sampled at substantially the positive-going peaks of the voltage waveforms A and B, respectively.

Referring now to Fig. 2a, let it be assumed that the electron beam 87 of the tube 22 encounters the perturbation P for the first time in position 1. The resulting derived signal from the pick-up tube 22 will then be fed to the first grid of the pentagrid tube 37, and will be sampled at the first peak A1 of the positive-going voltage waveform A. The derived signal represented by position 1 of the electron beam 87, in Fig. 2a is now fed from the anode of the pentagrid tube 37 to the tube 60 where it will be inverted to a positive-going signal at the anode thereof. This positive-going signal is represented as C1 in Fig. 3.

When the electron beam 87 has moved from position 1 to position 2, that is, when it has moved off the image of the perturbation, there will be no signal derived from the pick-up tube 22. Therefore, during the first positive-going limit of the oscillatory waveform B1 no output signal will be derived at the anode of the pentagrid 38. Consequently, no signal will be derived at the output of the inverter tube 79 when the electron beam is in position 2 of Fig. 2a. The absence of this signal is indicated in Fig. 3 as D2.

The output of the multivibrator 62 is a positive-going square wave of duration less than one period of oscillation of the oscillator 39. This square wave is differentiated at the resistor 71 and has the form shown by the first cycle of waveform E, in Fig. 3. The multivibrator 69 is adjusted to be triggered by the trailing edge E1 (Fig. 3) of the waveform E, and a positive-going square wave F1 is derived from the output of the multivibrator 69. The waveform F1 is applied to the cathode of the gate tube 64 to "gate off" the tube 64. Since the leading edge of this gate is delayed slightly less than one period of the oscillator 30, the output of the mutlivibrator 63 which is applied to the grid of the gate tube 64 produces the negative-going output signal G at the anode of the tube 64. This corresponds to beam position 1 in Fig. 2a.

The output signal G is applied to the multivibrator 70a whose positive-going output is differentiated across the resistor 71a to produce the differentiated waveform H of Fig. 3. The trailing edge H1 of the waveform H provides a delay of a little more than half of the period of oscillation of the oscillator 30, with respect to the leading edge of the positive-going square wave output of the multivibrator 70a. The multivibrator 73 is adapted to be triggered by the trailing edge H1 of the differentiated waveform H and to produce at its output a relatively narrow positive waveform J. Thus, the signal G is delayed and appears as the signal J at the output of the multivibrator 73. The waveform J is applied to the tube 74 in the comparator circuit. Although the tube 74 is biased to cutoff, it will be rendered conductive by the positive-going signal J applied to the grid thereof if no positive-going voltage is applied to the cathode thereof. In Fig. 2a, it has been seen that position 2 of the electron beam 87 will not produce a signal at the anode of the tube 79. Therefore, there will be no signal applied to the cathode of the tube 74 and the signal J, which resulted from the position 1 of the electron beam 87, will pass to the frame selector 84. In a manner to be described hereinafter, it will be explained how the signal applied to the frame selector 84 will be fed to the counter 85 and recorded. Thus, it is seen that when an electron beam 87 scans a perturbation P and produces a signal in position 1, its lower limit of oscillation, and produces no signal in position 2, its upper limit of oscillation, a single pulse J is produced which will ultimately be recorded on the electronic counter 85.

Referring again to Fig. 2a, it will be seen that the electron beam 87 in position 3 will cause a signal to be derived from the tube 22. This signal is fed to the grid of the pentagrid tube 37 where it will be sampled by the second positive-going peak A2 of the waveform A, and will appear as a positive-going signal C3 at the anode of the tube 60. The signal C3 will trigger the multivibrator 63 and produce a signal upon the grid of the gate tube 64. The cathode of the tube 64, however, now has applied to it the voltage waveform F1 which acts to render the tube 64 nonconductive. In other words, the signal F1 applied to the cathode of tube 64 will prevent the signal C3 from producing an output signal at the anode of the tube 64. Thus it is seen, referring to Fig. 2a, that when the electron beam 87 in position 1, first scans a perturbation P, a signal will be derived which will ultimately be counted by the counter 85. However, all subsequent sequential signals from the lower limits of oscillation of the beam 87, such as signals 3 and 5, will be blocked by the gate tube 64.

Referring now to Fig. 2b, let us consider the case where signals are derived from both the lower limits of oscillation 7, 9 and 11 and the upper limits of oscillation 8, 10 and 12 of the electron beam 87. The signals derived from positions 7, 9 and 11 of the electron beam 87 will cause signals C7, C9 and C11 of the waveform $C^1$ at the anode of the tube 60. Also, signals from the upper limits 8, 10 and 12 of the oscillatory electron beam 87 will cause signals D8, D10 and D12 of the waveform $D^1$ to be derived at the anode of the tube 79. The signals D8, D10 and D12 will be applied to the cathode of the tube 74 through the multivibrator 81, thereby raising the voltage of this cathode and preventing any signals from passing through the tube 74. Also, the signal C7 which will pass through the tube 64 will arrive at the grid of the tube 74, delayed a little more than a half period of the frequency of oscillation of the oscillator 30, as a signal J. By this time, however, the signal D8 has caused the signal K to be applied to the cathode of the tube 74 whereby its voltage is raised to a point rendering the tube 74 nonconductive, and therefore no signals will pass. Thus, it is seen that when the electron beam 87 oscillates in a manner so that both the upper and lower limits of its oscillations, while moving in a horizontal direction, scan a perturbation P no output signal is derived.

The third and remaining case shown in Fig. 2c will now be considered. When signals from the positions of the lower limits of oscillation 13, 15, 17 and 19 of the electron beam do not scan the perturbation P, no signals are derived at the first grid of the pentagrid tube 37, and consequently no signals will be fed to the grid of the comparator tube 74. Since the signals derived from the positions of the upper limits of oscillation 14, 16 and 18 of the electron beam 87 will be fed to the first grid of the pentagrid tube 38, the resulting signals fed to the cathode of the tube 74 will merely serve to maintain the tube 74 in a cutoff position, and consequently no signals will pass. Thus, it will be seen from a consideration of the three cases represented in Figs. 2a, 2b and 2c, that an output signal ultimately reaching the electronic counter 85 is produced only when the lower limit of the oscillating electron beam 87, in its horizontal scanning, first scans a perturbation, and when the upper limit of oscillation produces no signal because it is outside of the limits of the perturbation P.

Figure 4:
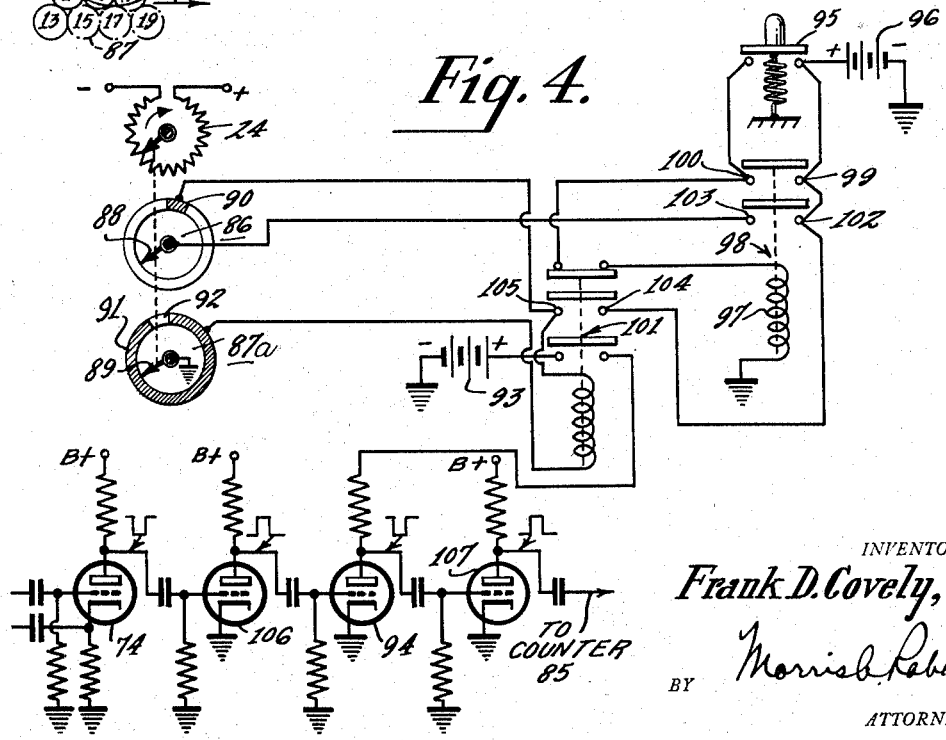
Fig. 4 is a schematic diagram of the frame selector shown in block form in Fig. 1.

Since the electron beam 87 may scan a number of perturbations P in forming the raster of a single frame, it is necesary to record only those signals derived from the perturbations scanned in a single frame. The frame selector 84, shown in detail in Fig. 4, comprises means to count the number of pulses appearing at the anodes of the comparator tube 74 during a single frame of the raster scanned by the electron beam 87 of the pick-up tube 22. Referring now to Fig. 4, there is shown switches 86 and 87a each having movable armatures 88 and 89, respectively, mechanically ganged to the movable tap of the potentiometer 24, and adapted to rotate clockwise and in parallel synchronism therewith, as shown. The armature 88 of the switch 86 is adapted to make contact with a small contact point 90 at the beginning of the vertical trace of the electron beam 87. The armature 89 of the switch 87a is adapted to make contact with an arcuate contact 91 for substantially the full length of the vertical trace of the electron beam 87, and is adapted to break contact at the end of the vertical trace when the armature 89 contacts insulating material 92. The armature 89 is grounded.

The purpose of the frame selector shown in Fig. 4, is to furnish a source of operating potential 93 to a gating tube 94 during the formation of a single frame of the raster scanned by the beam 87. When a button 95 is pressed momentarily, current from a unidirectional voltage source 96 will flow through a coil 97 of a relay 98, thereby causing the relay 98 to close. Once the relay 98 is closed, the button 95 may be released and current will flow from the unidirectional voltage source 96 through contacts 99 and 100 and through the coil 97 of the relay 98 to maintain the relay 98 in a closed position. With the relay 98 closed, current from the voltage source 96 flows to a relay 101, through the contacts 102 and 103 of the relay 98, when switches 86 and 87a are closed. The closing of the relay 101 will break the circuit to the relay 98 and the relay 98 will open. With the relay 101 closed, current can flow from the voltage source 96 through contact points 104 and 105 to maintain the relay 101 in a closed position. The relay 101 will remain in a closed position until the armature 89 of the switch 87a moves on to the insulated material 92, thereby breaking the circuit and the relay 101 will open. It will be understood, however, that during the time the relay 101 is closed operating potential is applied to the anode of the gate tube 94 from the unidirectional voltage source 93. Thus, it is seen that the frame selector of Fig. 4 will energize a gate tube 94 for the duration of time necessary for the electron beam 87 to sweep the image of the optical field 20 on the face 21 of the tube 22 for one frame of its raster.

Each signal derived at the anode of the comparator tube 74, representing a perturbation in the optical field 20, is fed to the electronic counter 85 through a triode 106, gate tube 94 and triode tube 107. The triode tubes 106 and 107 are used to invert the phase of the signal to a positive-going polarity, in a manner well known in the art. Thus it will be understood that when the gate tube 94 has an operating potential applied to it for the duration of the time necessary to form one frame of the scanned raster, only the signals derived from the perturbations scanned during one frame will be recorded on the electronic counter 85.

Thus, there has been shown and described, in accordance with the present invention, means for scanning an optical field with a spot wobbulated beam whereby signals are derived when the beam scans a perturbation in the optical field. The derived signals are sampled at the lower and upper limits of oscillation of the spot wobbulated electron beam, and may be referred hereinafter to as leading sampled signals and lagging sampled signals, respectively. Means are provided for comparing and gating successive leading and lagging sampled signals so that the first leading sampled signal followed by the absence of a lagging sampled signal produces a single output pulse which is counted. Means are provided to blank a leading sampled signal with the occurrence of a sequential succeeding lagging sampled signal and means are also provided to blank leading sampled signals which occur immediately after a previously leading sampled signal.

What is claimed is:

1. Apparatus for counting the perturbations in an optical field comprising means to scan said field with an electron beam, means to oscillate said beam in a spot wobbulated manner during scanning, means in circuit with said electron beam to derive signals therefrom when said beam scans a perturbation, means to sample said signals from the limits of the excursion of each oscillation of said oscillating beam to derive leading and lagging sampled signals therefrom, gating means to blank succeeding leading sampled signals upon the occurrence of an immediately preceding leading sampled signal, and means to blank a leading sampled signal upon the occurrence of an immediately succeeding lagging sampled signal, said last-mentioned means comprising means to produce an output pulse in response to a leading sampled signal and in the absence of an immediately succeeding lagging sampled signal.

2. Apparatus for counting the perturbations in an optical field comprising means to scan said field with an electron beam, means to oscillate said beam in a spot wobbulated manner during scanning, means in circuit with said electron beam to derive signals therefrom when said beam scans a perturbation, means to sample said signals from the limits of the excursion of each oscillation of said oscillating beam to derive leading and lagging sampled signals therefrom, gating means to blank succeeding leading sampled signals upon the occurrence of an immediately preceding leading sampled signal, means to blank a leading sampled signal upon the occurrence of an immediately succeeding lagging sampled signal, said last-mentioned means comprising means to produce an output pulse in response to a leading signal and in the absence of an immediately succeeding lagging sampled signal, and means to count said output pulses.

3. Apparatus for counting the perturbations in an optical field comprising means to scan said field with an electron beam, means to oscillate said beam in a spot wobbulated manner during scanning, means in circuit with said electron beam to derive signals therefrom when said beam scans a perturbation, means to sample said signals from the limits of the excursion of each oscillation of said oscillating beam to derive leading and lagging sampled signals therefrom, gating means to blank succeeding leading sampled signals upon the occurrence of an immediately preceding leading sampled signal, means to blank a leading sampled signal upon the occurrence of an immediately succeeding lagging sampled signal, said last-mentioned means comprising means to produce an output pulse in response to a leading signal and in the absence of an immediately succeeding lagging sampled signal, means to count said output pulses, and means to gate said output pulses occurring during one complete scan only of said optical field.

References Cited in the file of this patent

UNITED STATES PATENTS

| | | |
|---|---|---|
| 2,494,441 | Hillier | Jan. 10, 1950 |
| 2,584,052 | Sandorff et al. | Jan. 29, 1952 |
| 2,661,902 | Wolff et al. | Dec. 8, 1953 |
| 2,791,377 | Dell et al. | May 7, 1957 |